US011681274B2

(12) United States Patent
Saitou (10) Patent No.: US 11,681,274 B2
(45) Date of Patent: *Jun. 20, 2023

(54) POSTPROCESSOR DEVICE THAT GENERATES A MACHINING PROGRAM INCLUDING INSTRUCTION FOR CHANGING AT LEAST ONE PARAMETER TO BE USED FOR CONTROLLING AT LEAST ONE AXIS OF A CNC MACHINE TOOL

(71) Applicant: FANUC CORPORATION, Yamanashi (JP)

(72) Inventor: Kiwamu Saitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,298

(22) Filed: Oct. 9, 2018

(65) Prior Publication Data
US 2019/0129389 A1    May 2, 2019

(30) Foreign Application Priority Data
Oct. 30, 2017   (JP) .............................. JP2017-209757

(51) Int. Cl.
*G05B 19/416*    (2006.01)
*G05B 19/408*    (2006.01)
(Continued)

(52) U.S. Cl.
CPC ..... *G05B 19/4163* (2013.01); *G05B 19/4083* (2013.01); *G05B 19/4097* (2013.01);
(Continued)

(58) Field of Classification Search
CPC ............ G05B 19/4163; G05B 19/4141; G05B 19/4083; G05B 2219/35205; G05B 2219/35084; G05B 19/416
See application file for complete search history.

(56) References Cited

U.S. PATENT DOCUMENTS 5,532,932 A * 7/1996 Niwa .................... G05B 19/401
706/900
7,016,763 B2    3/2006 Fauser et al.
(Continued)

FOREIGN PATENT DOCUMENTS

DE    11 2015 004 939    8/2017
EP          2 871 547      5/2015
(Continued)

OTHER PUBLICATIONS

Notification of Reasons for Refusal dated Jul. 23, 2019 in Japanese Patent Application No. 2017-209757.
(Continued)

*Primary Examiner* — Kenneth M Lo
*Assistant Examiner* — Tameem D Siddiquee
(74) *Attorney, Agent, or Firm* — Wenderoth, Lind & Ponack, L.L.P.

(57) ABSTRACT

A postprocessor device outputs a machining program for controlling a CNC machine tool. The postprocessor device includes: a characteristic shape recognition unit configured to read information about a characteristic shape to be machined from cutter location data including information about a characteristic shape; a section setting unit configured to set one or more set sections on a tool path in response to the information about the characteristic shape; and a motion generation unit configured to generate a machining program including instruction for changing at least one parameter to
(Continued)

be used for controlling at least one axis of the CNC machine tool outside the set section and inside the set section.

7 Claims, 9 Drawing Sheets

(51) Int. Cl.
  G05B 19/414 (2006.01)
  G05B 19/4097 (2006.01)
(52) U.S. Cl.
  CPC .............. G05B 19/4141 (2013.01); *G05B 2219/35084* (2013.01); *G05B 2219/35205* (2013.01)

(56) References Cited

U.S. PATENT DOCUMENTS

| | | | |
|---|---|---|---|
| 8,406,913 B2* | 3/2013 | Fujishima | G05B 19/4155 700/173 |
| 2001/0018312 A1 | 8/2001 | Gottschalk | |
| 2003/0045964 A1* | 3/2003 | Lottgen | G05B 19/409 700/180 |
| 2003/0125828 A1 | 7/2003 | Corey | |
| 2004/0019394 A1* | 1/2004 | Red | G05B 19/4097 700/56 |
| 2005/0246052 A1* | 11/2005 | Coleman | G05B 19/40937 700/188 |
| 2007/0085850 A1* | 4/2007 | Hong | G05B 19/41 345/442 |
| 2007/0191982 A1* | 8/2007 | Sullivan | G05B 19/4093 700/182 |
| 2012/0011912 A1* | 1/2012 | Flegel | F16L 15/06 72/118 |
| 2015/0324492 A1* | 11/2015 | Iorio | G06F 8/427 703/1 |
| 2017/0227947 A1* | 8/2017 | Ndip-Agbor | G05B 19/29 |
| 2017/0231771 A1* | 8/2017 | Piron | A61B 8/0841 606/102 |
| 2017/0308057 A1* | 10/2017 | Kreidler | G05B 19/4069 |
| 2018/0150060 A1* | 5/2018 | Hsu | G05B 19/40937 |

FOREIGN PATENT DOCUMENTS

| | | |
|---|---|---|
| JP | 4-76606 | 3/1992 |
| JP | 4-331037 | 11/1992 |
| JP | 07-334222 | 12/1995 |
| JP | 9-29584 | 2/1997 |
| JP | 09-265310 | 10/1997 |
| JP | 09-269808 | 10/1997 |
| JP | 2000-089814 | 3/2000 |
| JP | 2000-311010 | 11/2000 |
| JP | 2001-125618 | 5/2001 |
| JP | 2002-096243 | 4/2002 |
| JP | 2003-334740 | 11/2003 |
| JP | 2004-284002 | 10/2004 |
| JP | 2005-004254 | 1/2005 |
| JP | 2005-513665 | 5/2005 |
| JP | 2012-152884 | 8/2012 |
| JP | 2017-156835 | 9/2017 |
| WO | 2011/004585 | 1/2011 |
| WO | 2016/067392 | 5/2016 |

OTHER PUBLICATIONS

Notification of Reasons for Refusal dated Feb. 4, 2020 in Japanese Patent Application No. 2017-209752.
Notification of Reasons for Refusal dated Sep. 24, 2019 in Japanese Patent Application No. 2017-209752.
Office Action dated Apr. 16, 2021 in U.S. Appl. No. 16/155,381.
Office Action dated Oct. 27, 2021 in U.S. Appl. No. 16/155,381.
Weck, M.; Brecher, Ch.: Werkzeugmaschinen. Bd. 4. Automatisierung von Maschinen und Anlagen. 6., neu bearb. Aufl.. Berlin [u. a.]: Springer, 2006. S. 218-228.—ISBN 978-3-540-22507-2.
Office Action dated Dec. 21, 2021 in German Patent Application No. 102018218202.7 with machine translation.
Office Action dated Feb. 10, 2022 in U.S. Appl. No. 16/155,381.
Office Action dated Aug. 9, 2022 in U.S. Appl. No. 16/155,381.

* cited by examiner

POSTPROCESSOR DEVICE THAT GENERATES A MACHINING PROGRAM INCLUDING INSTRUCTION FOR CHANGING AT LEAST ONE PARAMETER TO BE USED FOR CONTROLLING AT LEAST ONE AXIS OF A CNC MACHINE TOOL

This application is based on and claims the benefit of priority from Japanese Patent. Application No. 2017-209757, filed on 30 Oct. 2017, the content of which is incorporated herein by reference.

BACKGROUND OF THE INVENTION

Field of the Invention

The present invention relates to a postprocessor device, a machining program generation method, a CNC machining system, and a computer-readable information storage medium.

Related Art

Machining of a characteristic shape accurately such as an edge or a smooth surface is important during machining, particularly during die cutting. Hence, a desired machining system is to perform machining process responsive to a characteristic shape such as an edge or a smooth surface by incorporating information about this characteristic shape into cutter location data (CL data) or numerical control data (NC data), for example. However, conventional G-code in a machining program has found difficulty in determining from a tool path whether a workpiece is a smooth curved surface or an edge.

For example, patent documents 1 and 2 disclose machining program generators that generate a machining program in consideration of the shape of a workplace. Patent document 1 describes a curve extractor and an NC programming system for eliminating the need for complicated work such as reading of drawing information, coordinate calculation, input of a numerical value during generation of an NC program, and for reducing the occurrence of error. More specifically, the curve extractor extracts curve data (data about a closed loop, data about an open loop, data about a hole group, data about the shape of a groove center, etc.) from drawing data generated by a CAD system, for example. The NC programming system includes a CAM device that generates an NC program by inputting the drawing data generated, for example, by the CAD system into the curve extractor, and receiving the curve data generated by the curve extractor.

Patent document 2 describes a machining controller for allowing machining even by an operator with little experience and for preventing repetition of similar failures. More specifically, the machining controller allows machining under an appropriate machining condition by searching for a machining case in response to a characteristic of a shape to be machined, and setting a machining condition based on the searched machining case.

Patent Document 1: Japanese Unexamined Patent Application, Publication No. H04-76606
Patent Document 2: Japanese Unexamined Patent Application, Publication No. 2004-284002

SUMMARY OF THE INVENTION

The curve extractor and the NC programming system described in patent document 1 are to acquire machining area shape data by graphically displaying the drawing data generated by the CAD system, for example, causing an operator to specify an edge in the drawing, and extracting a closed loop, an open loop, a hole group, or the shape of a groove center using the specified edge. Hence, patent document 1 is not to perform machining process responsive to a characteristic shape such as an edge or a smooth surface by incorporating this characteristic shape into CL data or NC data, for example. The machining controller described in patent document 2 is to search for a machining case in the past in response to a characteristic of a shape to be machined and to set a machining condition based on the searched machining case. Hence, patent document 2 is not to perform machining process responsive to a characteristic shape such as an edge or a smooth surface by incorporating this characteristic shape into CL data or NC data, for example.

The present invention is intended to provide a postprocessor device, a machining program generation method, a CNC machining system, and a computer-readable information storage medium, for reading information about a characteristic shape such as an edge or a smooth surface, for example, in CL data to generate a machining program appropriate for machining process of the characteristic shape by incorporating the information about the characteristic shape into the CL data.

(1) A postprocessor device according to the present invention (postprocessor 22 described later, for example) outputs a machining program for controlling a CNC machine tool (CNC machine tool 30 described later, for example). The postprocessor device comprises:

a characteristic shape recognition unit (characteristic shape recognition unit 222 described later, for example) configured to read information about a characteristic shape to be machined from CL data (cutter location data) including information about a characteristic shape;

a section setting unit (section setting unit 223 described later, for example) configured to set one or more set sections on a tool path in response to the information about the characteristic shape; and a motion generation unit (in-section motion generation unit 224 and out-of-section motion generation unit 225 described later, for example) configured to generate a machining program including instruction for changing at least one parameter to be used for controlling at least one axis of the CNC machine tool outside the set section and inside the set section.

(2) The postprocessor device described in (1) may further comprise: a data reading unit (data reading unit 221 described later, for example) configured to read the CL data including the information about the characteristic shape; and a machining program output unit (machining program output unit. 226 described later, for example) configured to output the machining program.

(3) In the postprocessor device described in (1) or (2), the parameter may include at least one of parameter sets (A), (B), and (C) as follows:

(A) a command speed, an allowable acceleration, an allowable jerk, and a time constant related to acceleration/deceleration control, for a feed axis;

(B) a command speed, an allowable acceleration, an allowable jerk, and a time constant related to acceleration/deceleration control, for a spindle; and (C) an error amount allowed between a command path and an actual path.

(4) In the postprocessor device described in any one of (1) to (3), the information about the characteristic shape may include at least one of information sets (a) and (b) as follows:
(a) information about a section in which a tool contacts an edge of a workpiece on a tool path; and
(b) information about a section in which a tool path is a smooth curve, on the tool path.
(5) In the postprocessor device described in any one of (1) to (4), the parameter may include a feed speed of a feed axis and a spindle speed, and the motion generation unit may generate the machining program including instruction for changing the spindle speed in synchronization with change in the feed speed of the feed axis.
(6) In the postprocessor device described in any one of (1) to (5), the CL data may be a general purpose command independent of a machine and including information about the geometry of a workpiece or tool path and information about machining content, the informations being described in a format conforming to a data model having a hierarchical structure.
(7) A CNC machining system according to the present invention comprises the postprocessor device (postprocessor 22 described later, for example) described in any one of (1) to (6), and a CNC machine tool (CNC machine tool 30 described) later, for example) for CNC machining on a workpiece based on a machining program generated by the postprocessor device.
(8) A machining program generation method according to the present invention is implemented by a postprocessor device (postprocessor 22 described later, for example) that outputs a machining program for controlling a CNC machine tool (CNC machine tool 30 described later, for example), comprising: a step of reading information about a characteristic shape to be machined from CL data (cutter location data) including information about a characteristic shape;
a step of setting one or more set sections on a tool path in response to the information about the characteristic shape; and
a step of generating a machining program including instruction for changing at least one parameter to be used for controlling at least one axis of the CNC machine tool outside the set section and inside the set section.
(9) A non-transitory computer-readable information storage medium according to the present invention stores a program for machining program generation that causes a computer functioning as a postprocessor device (postprocessor 22 described later, for example) that outputs a machining program for controlling a CNC machine tool (CNC machine tool 30 described later, for example) to perform:
a process of reading information about a characteristic shape to be machined from CL data (cutter location data) including information about a characteristic shape;
a process of setting one or more set sections on a tool path in response to the information about the characteristic shape; and
a process of generating a machining program including instruction for changing at least one parameter to be used for controlling at least one axis of the CNC machine tool outside the set section and inside the set section.

The present invention is capable of providing a postprocessor device, a machining program generation method, a CNC machining system, and a computer-readable information storage medium for reading information about a characteristic shape such as an edge or a smooth surface, for example, in CL data to generate a machining program appropriate for machining process of the characteristic shape by incorporating the information about the characteristic shape into the CL data.

DETAILED DESCRIPTION OF THE INVENTION

Figure 1:
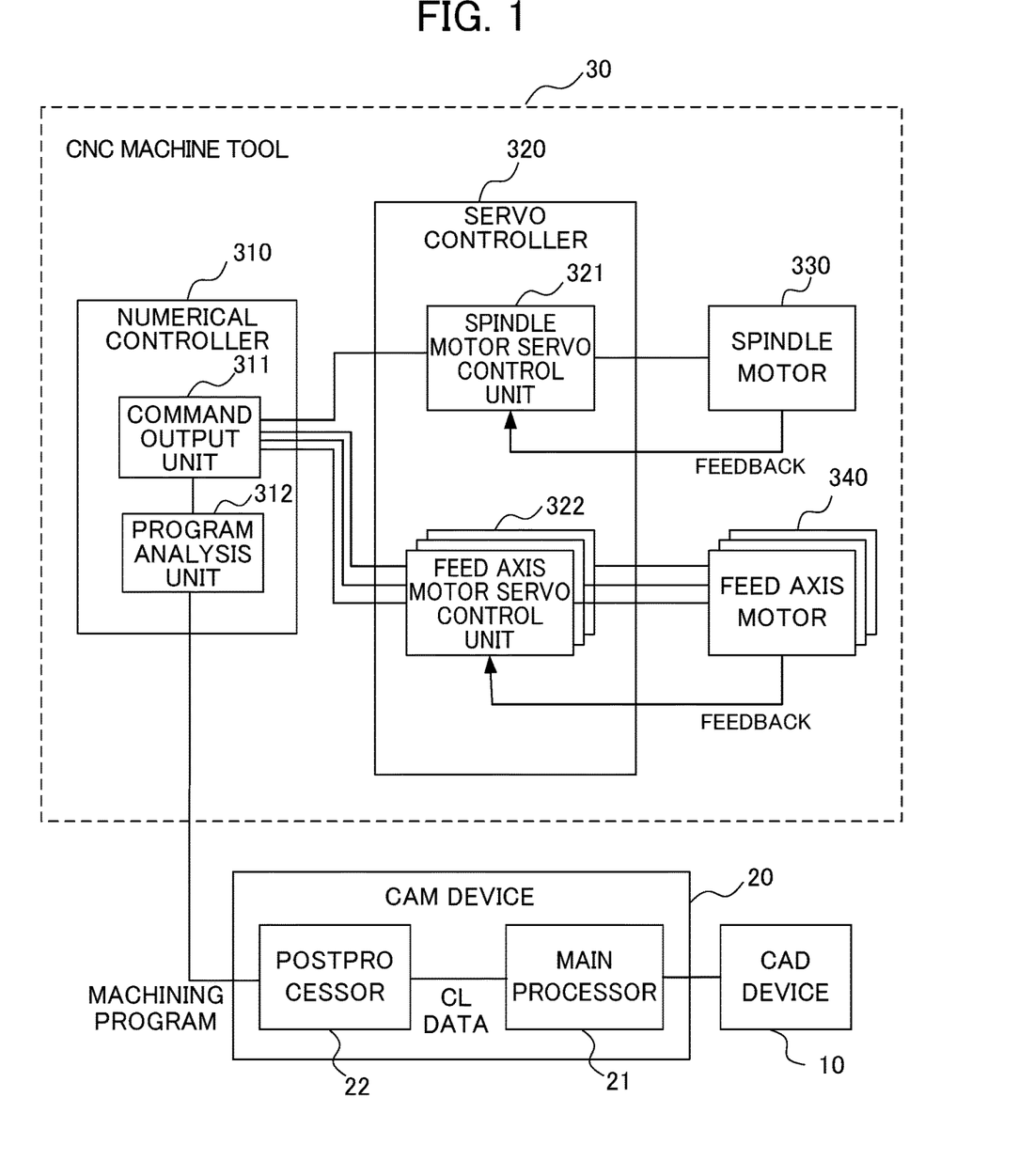
FIG. 1 is a block diagram showing an exemplary configuration of a CNC machining system according to an embodiment of the present invention.

An embodiment of the present invention will be described below in detail using the drawings. FIG. 1 is a block diagram showing an exemplary configuration of a CNC machining system according to the embodiment of the present invention. As shown in FIG. 1, the computerized numerical control (CNC) machining system includes a computer aided design (CAD) device 10, a computer aided manufacturing (CAM) device 20, and a CNC machine tool 30.

The CAD device 10 operates CAD software for drafting on a screen of a computer using a CPU. A figure of a workpiece (workpiece) is drawn using two-dimensional CAD or three-dimensional CAD. If two-dimensional CAD is used, the CAD device 10 draws a front view, a top view, a side view, etc. of the workpiece on an KY plane. If three-dimensional CAD is used, the CAD device 10 draws a three-dimensional image of the workpiece on XYZ three-dimensional space.

The CAM device 20 includes a main processor 21 and a postprocessor 22. The CAM device 20 operates CAM software for generating a machining program (NC data) based on the shape of the workpiece generated by the CAD device 10 using the CPU of the computer. The CAM software is configured using main processor software for causing the CAM device 20 to operate as the main processor 21, and postprocessor software for causing the CAM device 20 to operate as the postprocessor 22. The main processor software and the postprocessor software may be operated on the same computer or on different computers. The main processor 21 sets the motion of a tool or a machine tool so as to acquire a geometry based on CAD data, and converts the set motion to cutter location data (CL data). The postprocessor 22 generates a machining program (NC data) based on the CL data generated by the main processor 21. The configuration of the postprocessor 22 will be described in detail later.

The CNC machine tool 30 includes a numerical controller 310, a servo controller 320, a spindle motor 330, and a feed axis motor 340. The CNC machine tool 30 is a 3-axis machine tool, for example. In FIG. 1, only the spindle motor 330 and the feed axis motor 340 are shown as units of the 3-axis machine tool responsible for machining. The spindle motor 330 rotates a tool such as a ball endmill. The feed axis motor 340 includes three motors: a motor for an X-axis direction, a motor for a Y-axis direction, and a motor for a Z-axis direction. The motor for the X-axis direction and the motor for the Y-axis direction move a table linearly in the X-axis direction and the Y-axis direction respectively through a ball screw, for example, with a substrate for forming a workpiece placed on the table. The motor for the Z-axis direction moves the tool or the table linearly in the Z-axis direction. The foregoing is not the limited configuration of the 3-axis machine tool. The 3-axis machine tool may be configured to move the table linearly in the X-axis direction, the Y-axis direction, and the Z-axis direction while the tool is fixed, or may be configured to move the tool linearly in the X-axis direction, the Y-axis direction, and the Z-axis direction while the table is fixed, for example. The CNC machine tool 30 is not limited to the 3-axis machine tool but may be a 5-axis machine tool, for example.

The numerical controller 310 includes a command output unit 311 and a program analysis unit 312. The program analysis unit 312 sequentially reads blocks each including respective movement commands for the spindle, the X axis, the Y axis, and the Z axis and a rotation command for the spindle from the machining program (NC data) generated by the postprocessor 22 of the CAM device 20, analyzes the read blocks, generates command data including the respective movement commands for the spindle, the axis, the Y axis and the Z axis, and the rotation command for the spindle, and outputs the generated command data to the command output unit 311.

The command output unit 311 calculates a speed of each axis based on the command data output from the program analysis unit 312, and outputs data based on a result of the calculation to a spindle motor servo control unit 321 in the servo controller 320 and three feed axis motor servo control units 322 for the X axis, the Y axis, and the Z axis in the servo controller 320.

The spindle motor servo control unit 321 controls the spindle motor 330 based on the output from the command output unit 311. The three feed axis motor servo control units 322 for the X axis, the Y axis, and the Z axis control corresponding ones of the three feed axis motors 340 for the X axis, the Y axis, and the Z axis based on the output from the command output unit 311. The spindle motor servo control unit 321 and the three feed axis motor servo control units 322 each include a position control unit and a speed control unit for forming a position feedback loop and a speed feedback loop, a motor drive amplifier for driving a spindle motor or a feed axis motor based on a torque command value, an operator's panel for accepting operation from a user, etc.

The spindle motor servo control unit 321 calculates a backlash compensation value using a position feedback signal from a position detector such as an encoder connected to the spindle motor 330 and a position command output from the numerical controller 310, and compensates for the position command. The three feed axis motor servo control units 322 each calculate a backlash compensation value using a position feedback signal from a post-on detector such as an encoder coupled to a corresponding one of the three feed axis motors 340 and a position command output from the numerical controller 310, and compensates for the position command. The internal configuration of the spindle motor servo control unit 321 and those of the three feed axis motor servo control units 322 are well known to a person skilled in the art, so that they will not be described in detail and are not illustrated in detail in the drawings.

In the CNC machining system described above, the CAD device 10 and the CAM device 20 may be integrated and configured in one computer. Alternatively, the CAD device 10 and the CAM device 20 may be incorporated in the numerical controller 310. Further, the servo controller 320 may be incorporated in the numerical controller 310.

<Postprocessor 22>

Figure 2:
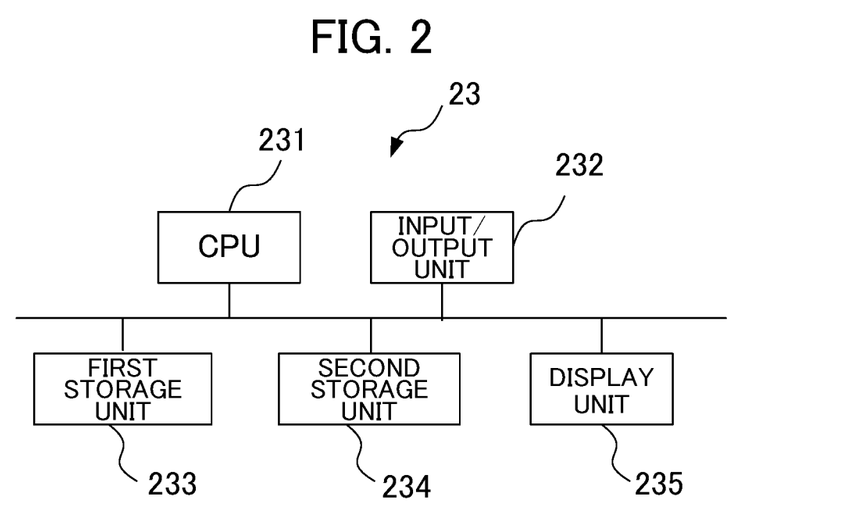
FIG. 2 is a block diagram showing the configuration of a computer relating to a postprocessor.

The postprocessor 22 will be described next. FIG. 2 shows the configuration of a computer 23 operating as the postprocessor 22. As shown in FIG. 2, the computer 23 forming the postprocessor 22 at least includes a CPU 231, an input/output unit 232, a first storage unit 233, a second storage unit 234, and a display unit 235. The CPU 231, the input/output unit 232, the first storage unit 233, the second storage unit 234, and the display unit 235 are connected through a bus.

The CPU 231 is configured using a microprocessor with a CPU, a RAM, a ROM, an I/O, etc., for example. The CPU 231 executes a program read from the first storage unit 233 such as a hard disk drive or a ROM, for example. For execution of the program, the CPU 231 receives CL data through the input/output unit 232, for example, reads information from the first storage unit 233 or the second storage unit 234 such as a RAM, and writes information resulting from operation into the first storage unit 233 or the second storage unit 234. The CPU 231 transmits and receives signals to and from the display unit 235 and the input/output unit 232, and displays the contents of the processing on the display unit 235, for example.

More specifically, the CPU 231 executes programs forming the postprocessor software (these programs will also be called an "postprocessor application" collectively), thereby causing the computer 23 to function as the postprocessor 22. The CPU 231 executes a program to cause the computer 23 to follow predetermined procedures (hereinafter called a "machining program generation procedure" collectively).

A function belonging to the CPU 231 will be described below from the viewpoint of the postprocessor 22. A function belonging to the CPU 231 from the viewpoint of the machining program generation procedure (method) to be followed by the postprocessor 22 will not be described as it can be understood by replacing a "unit" by a "procedure."

Figure 3:
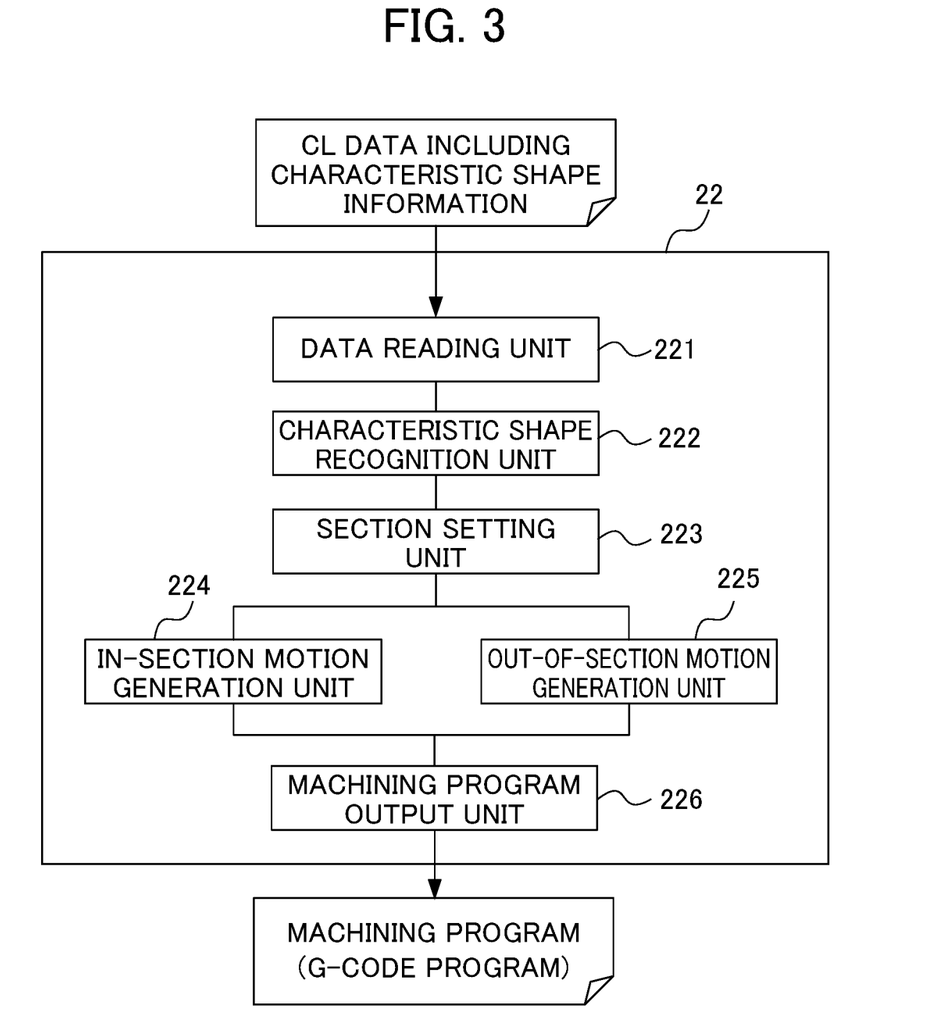
FIG. 3 is a block diagram showing the function of the postprocessor.

FIG. 3 is a block diagram showing the function of the postprocessor 22 according to the present invention. As shown in FIG. 3, the postprocessor 22 includes a data reading unit 221, a characteristic shape recognition unit 222, a section setting unit 223, an in-section motion generation unit 224, an out-of-section motion generation unit 225, and a machining program output unit 226. Before description of each functional unit of the postprocessor 22 is given, CL data to be input to the postprocessor 22 will be described.

<About CL Data>

For example, CL data to be input into the postprocessor 22 is configured to include information about a characteristic shape such as an edge or a smooth surface, for example.

More specifically, the CL data can include information pieces from information Inf1 to Information Inf5 as follows:
(Inf1) information about a tool path;
(Inf2) information about a characteristic shape on a tool path;
(Inf3) information about a tool used for machining;
(Inf4) information about a machining condition; and
(Inf5) information about order of machining.

The information Inf1 (=information about a tool path) includes information about a tool path, etc. (CL data itself) resulting from offsetting of a tool shape to conform to the contour shape of a workpiece, for example. The information Inf2 (=information about a characteristic shape on a tool path) includes characteristic section information describing a characteristic in a certain section on a tool path. The characteristic section information includes information about an edge section in which a tool contacts an edge of a workpiece, on a tool path, or information about a smoothing section in which a tool path is a smooth curve, on the tool path, for example. The information Inf3 (=information about a tool used for machining) includes information about the type, dimension, etc. of a tool, for example. The information Inf4 (=information about a machining condition) includes information about a feed speed on a tool path, a spindle speed on the tool path, or use of a cutting fluid, for example. The information Inf5 (=information about order of machining) includes information about order in which machining steps are performed. The information Inf2 and the information Inf4 are particularly important for processing by the postprocessor 22.

Figure 4:
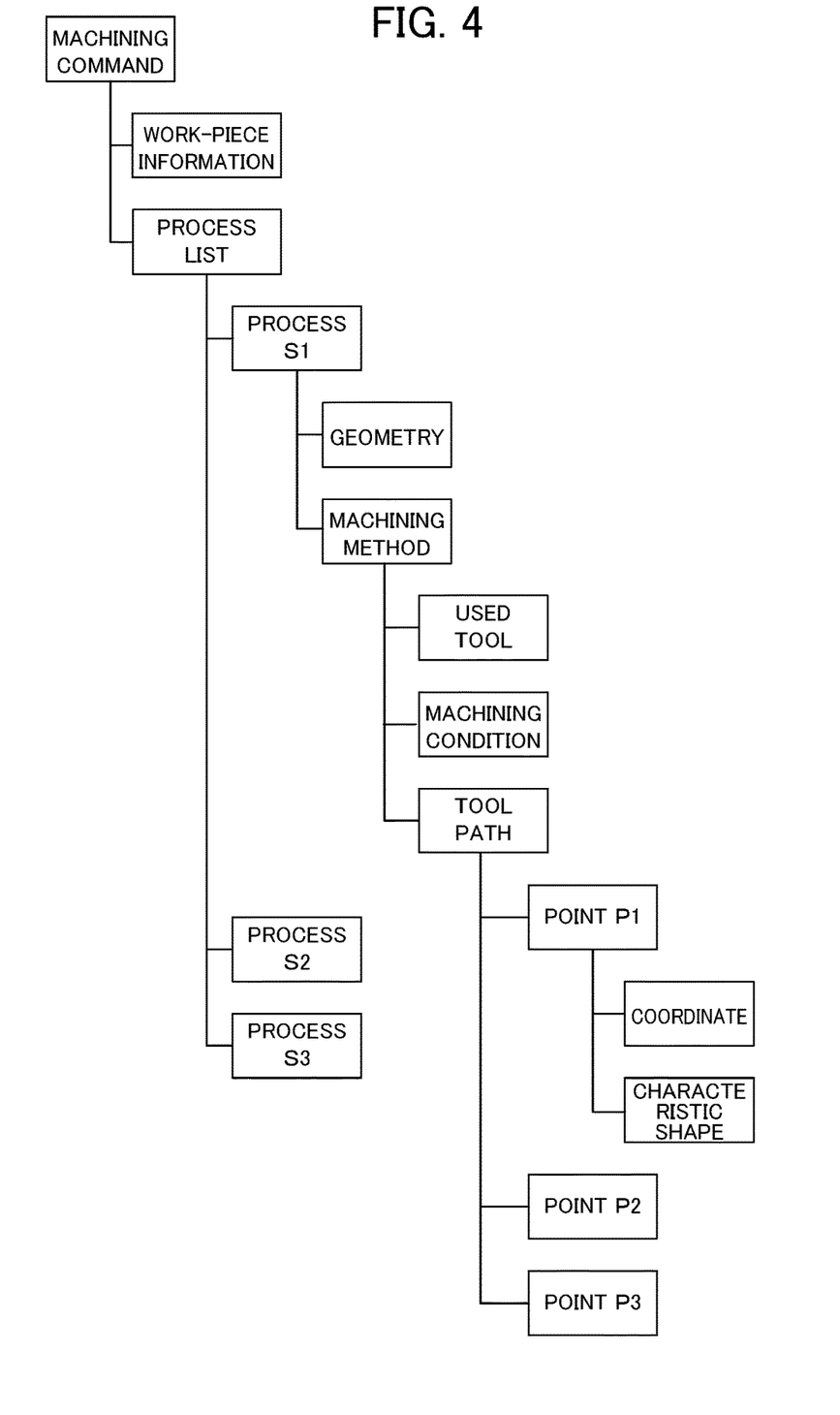
FIG. 4 is a configurational view showing an example of a data model based on ISO 14649.

For reference, a data model for the CL data including the foregoing information pieces has a hierarchical structure such as ISO 14649, for example. As long as the hierarchical structure of the data model for the CL data has a format allowing necessary information to be described appropriately, however, ISO 14649 is not the only example. FIG. 4 is a configurational view showing the hierarchical structure of a data model based on ISO 14649. The information Inf2 (=information about a characteristic shape on a tool path) is not contained in the hierarchical structure of the data model based on ISO 14649, so that it is provisionally set as "characteristic shape" corresponding to structural data subordinate to "tool path" in this hierarchical structure of the data model. Referring to the hierarchical structure of the data model shown in FIG. 4, the information Inf1 (=information about a tool path) can be described in "geometry" and "tool path," the information Inf2 (=information about a characteristic shape on a tool path) can be described in "characteristic shape," the information. Inf3 (=information about a tool used for machining) can be described in "used tool," the information Inf4 (=information about a machining condition) can be described in "machining condition," and the information Inf5 (=information about, order of machining) can be described in "step list," for example. By doing so, the CL data including information pieces from the information Inf1 to the information Inf5 can be described as information having a structure defined based on the data model. For example, the information pieces from the information Inf1 to the information Inf5 may be inserted into the CL data as comments in the form of information in text tagged by means (such as XML). The information contained in the CL data to be input into the postprocessor 22 is as described above. Each functional unit of the postprocessor 22 will be described next.

The data reading unit 221 reads CL data generated by the main processor 21, for example, and including the information. Inf1 information about a tool path), the information Inf2 (=information about a characteristic shape on a tool path), the information Inf3 (=information about a tool used for machining), the information Inf4 (=information about a machining condition), and/or the information Inf5 (=information about order of machining).

The characteristic shape recognition unit 222 detects every information Inf2 (=information about a characteristic shape on a tool path) contained in the CL data in each machining step. If the characteristic shape recognition unit 222 recognizes that the information Inf2 is about an edge section, for example, the characteristic shape recognition unit 222 acquires a start point of the edge section and an end point of the edge section, and acquires information about a machining condition from the information Inf4 such as a feed speed on a tool path including this edge section or a spindle speed on the tool path, for example. If the characteristic shape recognition unit 222 recognizes that the information Inf2 is about a smoothing section in which the tool path is a smooth curve, on a tool path, for example, the characteristic shape recognition unit 222 acquires information about a tool path given as a continuous straight line and information about a smoothing section in which a shape is smoothened, on the tool path. The smoothing section information can include information about a start point and an end point of the smoothing section, and a change rate of a tool direction (showing a degree to which a traveling direction of a tool changes while the tool travels a constant distance) allowed in the smoothing section.

The section setting unit 223 sets a constant section on a tool path for each information Inf2 (=information about a characteristic shape on a tool path) detected by the characteristic shape recognition unit 222 based on characteristic shape information in the information Inf2.

Figure 5:
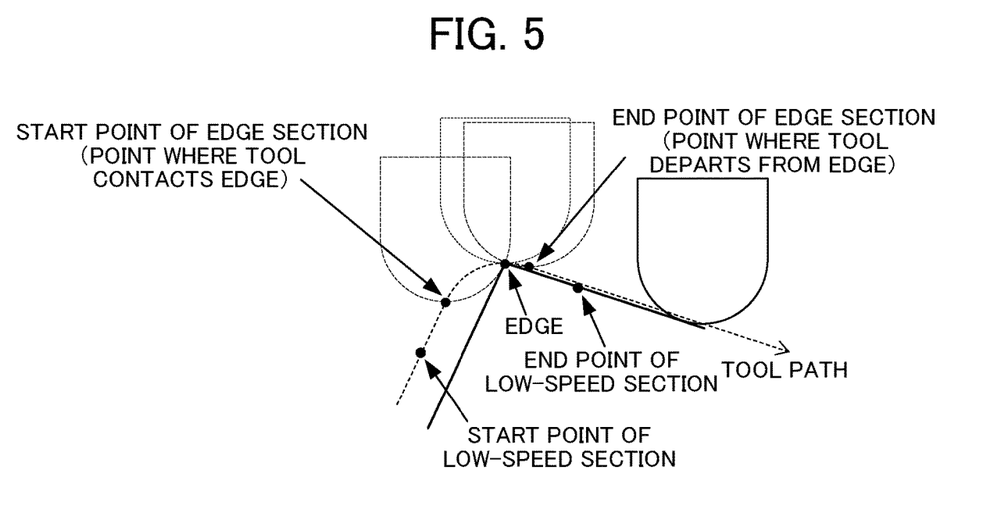
FIG. 5 is an explanatory view showing an example of use of information about an edge section as characteristic section information.

More specifically, if the information Inf2 detected by the characteristic shape recognition unit 222 is about an edge section in which a tool contacts an edge of a workpiece on a tool path, the section setting unit 223 sets a low-speed section automatically on the tool path including the edge section. As shown in FIG. 5, for example, a start point and an end point of the low-speed section are set in such a manner that the low-speed section becomes larger than the edge section. A range of the low-speed section may be determined in advance, or may be calculated in response to a machining condition. Processing relating to setting of the low-speed section will be described in detail later.

If the section setting unit 223 recognizes that the information Inf2 detected by the characteristic shape recognition unit 222 is about a smoothing section, the section setting unit 223 sets a smoothing section on a tool path based on the smoothing section information. More specifically, the section setting unit 223 sets a smoothing section on a tool path based on the given smoothing section information. The smoothing section set by the section setting unit 223 is a section set on a tool path based on the foregoing smoothing section information. For example, a start point and an end point shown in FIG. 8 agree with corresponding points described in the smoothing section information. The section setting unit 223 generates a new tool path most approximate to a tool path given by a broken line while setting a change rate of a tool direction at a value not exceeding an allowance in the smoothing section. The section setting unit 223 may generate a tool path having high-order continuity (generally called G2 continuity or G3 continuity) by further setting an allowance for a change rate of a traveling direction.

The section setting unit 223 can increase the smoothness of a curve by adjusting a speed or a maximum acceleration in a smoothing section. Many CNC machine tools generally have a function of selecting a mode of moving a tool between a first machining mode faithful to a command and a second machining mode giving priority to smoothness. The first machining mode is a machining mode in which, if a tool path in an NC command is given by a broken line, machining proceeds so as to follow the broken line faithfully. The second machining mode is a machining mode in which, even if a tool path in an NC command is given by a broken line, the tool path is smoothened and machining proceeds smoothly. There is also a CNC machine tool capable of selecting the first machining mode or the second machining mode in stages in a manner that depends on a degree of smoothing of a tool path. A maximum allowable acceleration/deceleration of a motor differs between the first machining mode and the second machining mode. A machine operates more faithfully to a command with a higher allowable acceleration/deceleration. The first machining mode or the second machining mode is selected generally before machining. If information about a smoothing section is described in the information Inf2 (=information about a characteristic shape on a tool path) as described above, the information about the smoothing section can be specified in such a manner that a mode is changed automatically between the inside and the outside of the smoothing section, for example, in such a manner that machining proceeds in the first machining mode faithful to a command outside the smoothing section and machining proceeds in the second machining mode giving priority to smoothness inside the smoothing section. In this case, regarding a parameter for a machining program (NC data) to be generated by the postprocessor 22, a maximum allowable acceleration/deceleration allowed for a motor is changed between the inside and the outside of the smoothing section. The information about the smoothing section can also be specified so as to select the first machining mode or the second machining mode in response to a degree of smoothing in the smoothing section. Processing relating to setting of the smoothing section will be described in detail later.

The in-section motion generation unit 224 generates a part of a machining program (NC data) to be generated by the postprocessor 22 and to be used for controlling motion in a constant section on a tool path set by the section setting unit 223. The section setting unit 223 sets the constant section on the tool path based on characteristic shape information in each information Inf2 (=information about a characteristic shape on a tool path) in CL data. Processing relating to generation of the part of the machining program (NC data) to be used for controlling motion in the section will be described in detail later.

The out-of-section motion generation unit 225 generates a part of the machining program to be used for controlling motion outside the set section if the set section is an edge section, for example, the out-of-section motion generation unit 225 calculates a speed command in the machining program (NC data) for setting a feed speed again at a feed speed F1 outside the section after passage through a low-speed section. The out-of-section motion generation unit 225 may be omitted, and the in-section motion generation unit 224 may calculate a speed command in the machining program (NC data) for setting a feed speed again at the feed speed F1 after passage through the low-speed section. If the set section is a smoothing section, the out-of-section motion generation unit 225 may be omitted, and the in-section motion generation unit 224 may calculate a speed command in the machining program (NC data) for making a change to the foregoing first machining mode after passage through the smoothing section, for example.

The in-section motion generation unit 224 and the out-of-section motion generation unit 225 generate a parameter for a part of a machining program (NC data) to be used for controlling motion in a constant section on a tool path and a parameter for a part of the machining program (NC data) to be used for controlling motion outside the section respectively. The generated parameters are parameters in one, or two or more of the following parameter sets (1), (2), and (3), for example:

(1) a command speed, an allowable acceleration, an allowable jerk, and a time constant related to acceleration/deceleration control, for a feed axis;
(2) a command speed, an allowable acceleration, an allowable jerk, and a time constant related to acceleration/deceleration control, for a spindle; and
(3) an error amount allowed between a command path and an actual path.

The machining program output unit 226 generates a machining program (NC data) by combining two parts including the part of the machining program (NC data) to be used for controlling motion in the section generated by the in-section motion generation unit 224 and the part of the machining program (NC data) to be used for controlling motion outside the section generated by the out-of-section motion generation unit 225, and outputs the generated machining program (NC data). The machining program (NC data) generated in this way is input into the CNC machine tool 30 (numerical controller 310). The CNC machine tool 30 (numerical controller 310) can perform machining process in an edge section and/or a smoothing section, for example, based on the NC data.

First Example of Use of Characteristic Section Information: Information About Edge Section The following explains an example of characteristic section information by describing processing relating to an edge section by the section setting unit 223 and the in-section motion generation unit 224 in detail while referring to FIG. 5. In this example of use, CL data includes the information Inf2 describing information about an edge section, and the information Inf4 describing information about machining conditions such as a feed speed on a tool path including the edge section and a spindle speed on the tool path, etc.

The section setting unit 223 sets a low-speed section automatically on the tool path including the edge section. As shown in FIG. 5, a start point and an end point of the low-speed section are set in such a manner that the low-speed section becomes larger than the edge section. A range of the lowspeed section may be determined in advance, or may be calculated in response to the machining conditions.

The following explains reason why the low-speed section is set to be larger than the edge section. In a machine tool, if a speed command changes steeply, a load is generally applied to a motor and this may cause rattling of the motor. Hence, in the machine tool, change in a speed command in a machining program (NC data) is controlled in such a manner that an actual feed speed changes more smoothly (more gently) than a speed in the speed command. Thus, the speed command calculated so as to set a feed speed F2 appropriate for edge machining in the edge section by starting speed reduction shortly before the edge section to complete deceleration before entry into the edge section, and starting acceleration after passage through the edge section.

Figure 6:
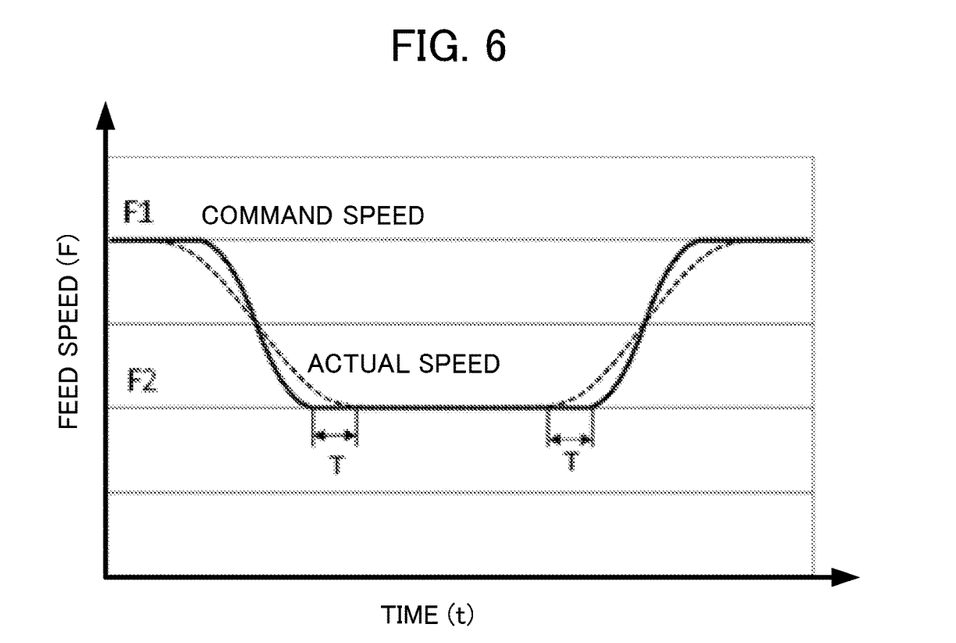
FIG. 6 shows characteristics about a relationship between a command speed and an actual speed determined by changing a feed speed.

FIG. 6 shows exemplary characteristics about a relationship determined by changing a command speed in a speed command between change in the command speed described in a machining program (NC data) and actual speed change controlled so as to be smoother (gentler) than the change in the command speed in a machine tool. A solid line shows the change in the command speed described in the machining program (NC data). A dashed line shows the actual speed change controlled so as to be smoother (gentler) than the change in the command speed in the machine tool. In this example, assuming that a time constant is T, an actual speed of a tool at given time t corresponds to the average of a command speed at time (t−time constant T) and a command speed at time (t+time constant T) as shown in FIG. 6, for example. Hence, giving a command immediately before a start point of an edge section so as to set a feed speed in the edge section at F2 actually makes the tool enter the edge section wile deceleration of the tool not finished. Regarding an end point of the edge section, giving a command so as to start acceleration at the end point of the edge section actually accelerates the tool before the tool exits the edge section. To avoid the occurrence of such a situation, the section setting unit 223 sets a point before the start point of the edge section and separated from the start point of the edge section by a distance corresponding to the time constant (nearly F2×T) as a start point of a low-speed section. Further, the section setting unit 223 sets a point ahead of the end point of the edge section and separated from the end point of the edge section by F2×T as an end point of the low-speed section. To calculate the feed speed F2 in the edge section on an as-needed basis, the section setting unit 223 to calculate a value F2×T also on an as-needed basis. If the feed speed F2 in the edge section is a value determined in advance, F2×T may be given in advance in the information Inf4 (=information about a machining condition), for example.

The in-section motion generation unit 224 compares the commanded feed speed F1 on a tool path with the feed speed F2 appropriate for edge machining. If the feed speed F1 is higher than the feed speed F2, the in-section motion generation unit 224 describes a speed command in a machining program (NC data) in such a manner that a feed speed F3 in the low-speed section does not exceed F2. The feed speed F2 may have a value determined in advance, or a value calculated based on a tool diameter or an edge angle.

Figure 7:
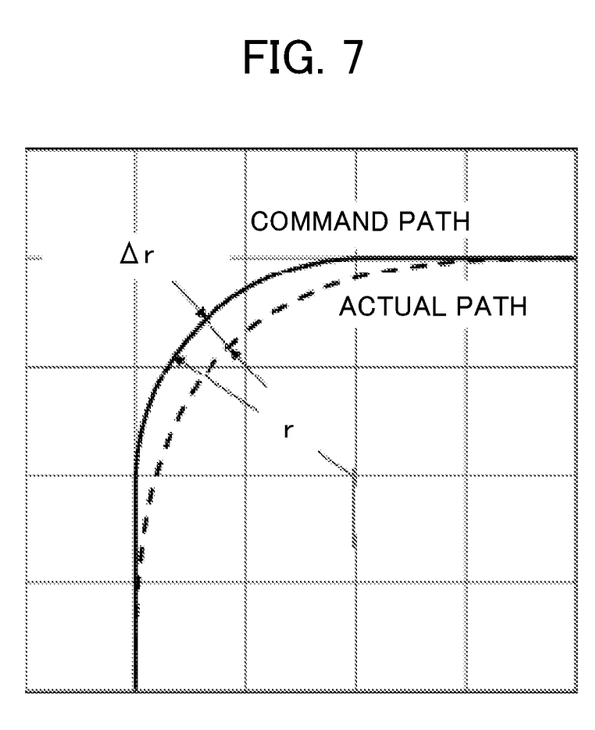
FIG. 7 shows a path radius r and path error Δr.

FIG. 7 shows a path radius r and path error Δr. The path radius r agrees with a tool diameter. The path error (a difference between a command path and an actual path) Δr is the dimension of corner sagging allowed for an edge. An acceleration/deceleration time constant T of a machine is a value dependent on setting of the machine. Basically, if a curve in a tool path becomes steeper and allowable error becomes smaller, a feed speed is required to be lower. The feed speed F2 at which corner sagging does not exceed an allowance is determined by calculating a value that satisfies a relationship in Math. 1, for example. As understood from Math. 1, the feed speed F2 is required to be lower with a smaller tool diameter and with less allowable corner sagging. The feed speed F2 can be registered in advance by being determined based on a tool having the smallest diameter expected to be used and the smallest allowance about corner sagging to occur during machining by a machine using this tool.

$$F2 \propto (\Delta x \times r)^{0.5}/T \qquad [\text{Math. 1}]$$

r: PATH RADIUS

Δx: PATH ERROR

T: ACCELERATION/DECELERATION TIME CONSTANT OF MACHINE

As described above, the out-of-section motion generation unit 225 describes a speed command in a machining program for setting a feed speed again at the feed speed F1 after passage through a low-speed section. The out-of-section motion generation unit 225 may be omitted, and the in-section motion generation unit 224 may describe a speed command in the machining program for setting a feed speed again at the feed speed F1 after passage through the low-speed section.

As described above, information about a characteristic shape such as an edge section is incorporated into the information Inf2 (=information about a characteristic shape on a tool path) in CL data to be input into the postprocessor 22, and information about a machining condition such as a feed speed on a tool path including this edge section or a spindle speed on the tool path is incorporated into the information Inf4 (=information about a machining condition) in this CL data, for example. By doing so, the postprocessor 22 becomes capable of generating a machining program (NC data) used for performing machining process in the edge section conforming to the information Inf2 (=information about a characteristic shape on a tool path) and the information Inf4 (=information about a machining condition). This facilitates machining of a shape that has not been machined easily by conventional G-code.

Second Example of Use of Characteristic Section Information: Information About Smoothing Section The following explains an example of characteristic section information by describing processing relating to a smoothing section by the section setting unit 223 and the in-section motion generation unit 224 in detail while referring to FIG. 8. In this example of use, CL data includes the information Inf2 describing information about a smoothing section.

The section setting unit 223 sets a smoothing section on a tool path based on given smoothing section information. As described above, the smoothing section information is information described in CL data and includes information about a start point and an end point of the smoothing section, and a change rate of a tool direction (showing a degree to which a traveling direction of a tool changes while the tool travels a constant distance) allowed in the smoothing section. The section setting unit 223 sets the smoothing section as a section set on a tool path based Cr the smoothing section information. The start point and the end point shown in FIG. 8 agree with corresponding points described in the smoothing section information. The section setting unit 223 generates a new tool path most approximate to a tool path given by a broken line while setting a change rate of a tool direction at a value not exceeding an allowance in the smoothing section. The section setting unit 223 may generate a tool path having high-order continuity (generally called G2 continuity or G3 continuity) by further setting an allowance for a change rate of a traveling direction.

Figure 8:
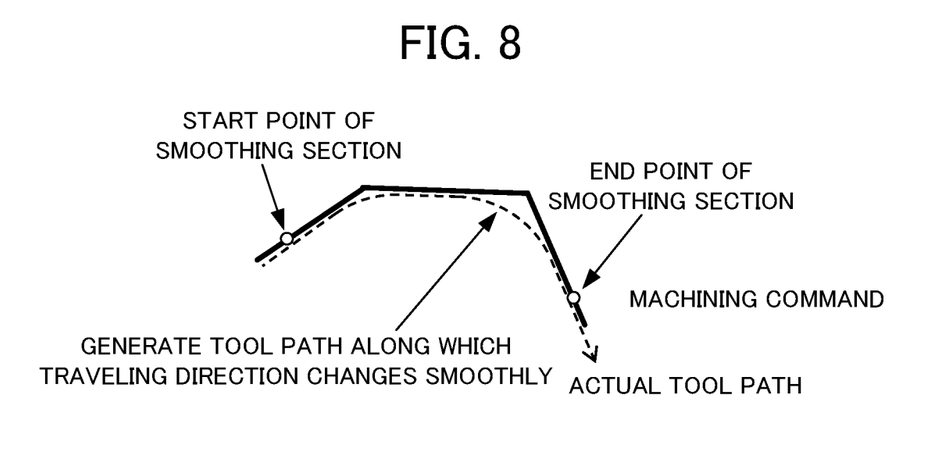
FIG. 8 is an explanatory view showing an example of use of information about a smoothing section as characteristic section information.

The in-section motion generation unit 224 replaces an input tool path by a tool path along which line segments are connected smoothly in the smoothing section in such a manner that the dimension of change in a traveling direction for a distance of move of a tool set by the section setting unit 223 does not exceed an allowance. The allowance may be set in advance, or may be described in the smoothing section information, for example. As described above, the out-of-section motion generation unit 225 is not used in this example of use. The in-section motion generation unit 224 generates a machining program using the tool path replacing the path in the smoothing section. As described above, the smoothing section information is incorporated into the information Inf2 (=information about a characteristic shape on a tool path) in CL data to be input into the postprocessor 22. By doing so, the postprocessor 22 is allowed to generate a machining program (NC data) used for performing machining process in the smoothing section conforming to the information Inf2 (=information about a characteristic shape on a tool path). This facilitates machining of a shape that has not been machined easily by conventional G-code.

Figure 9:
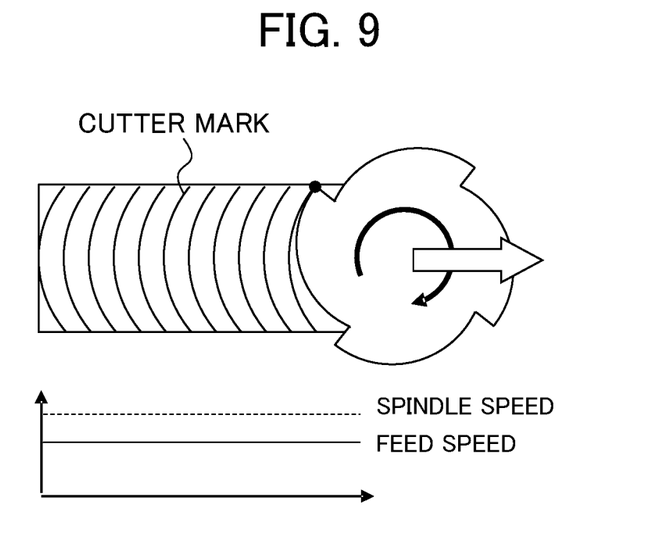
FIG. 9 shows the density of cutter marks with a constant feed speed and a constant spindle speed.
Figure 10:
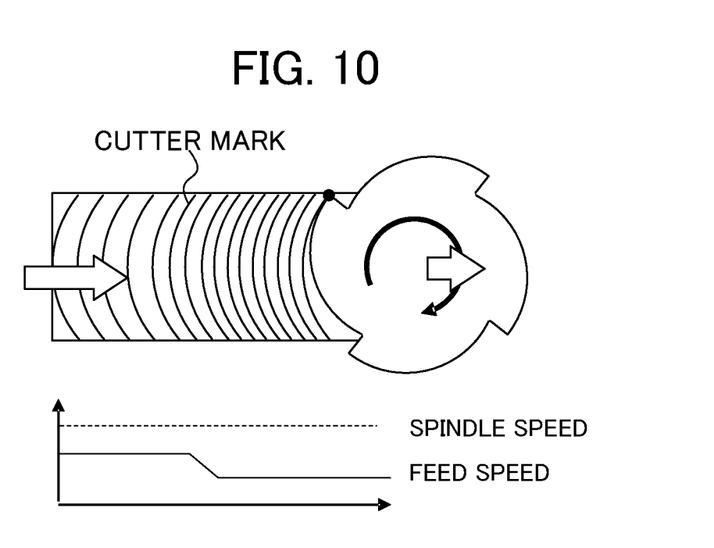
FIG. 10 shows the density of cutter marks with a lower feed speed and a constant spindle speed.
Figure 11:
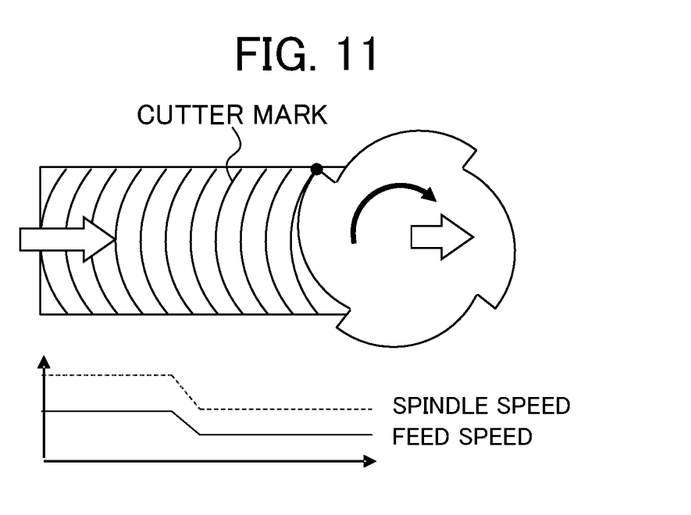
FIG. 11 shows the density of cutter marks with changes both in a feed speed and a spindle speed.

Third Example of Use in Control Over Spindle Speed Synchronized with Feed Speed The following describes an example of use in control over a spindle speed synchronized with a feed speed. This example of use is further applicable to the foregoing first example of use and second example of use. When the in-section motion generation unit 224 changes a feed speed, the in-section motion generation unit 224 preferably changes a spindle rotation speed together with the feed speed. As shown in FIG. 9, for example, if both a feed speed and a spindle speed are at constant values, cutter marks are left at a constant density. The cutter mark mentioned herein is a path of a tool edge left on a machining surface. By contrast, if the feed speed becomes lower while the spindle speed is kept at the constant value, the density of cutter marks changes as shown in FIG. 10 to change the properties and appearance of the machining surface. Hence, to change a feed speed to F2 (<F1 in preparation for process such as process in an edge section on a tool path, for example, along which the feed speed F1 and a spindle speed S1 are specified, the in-section motion generation unit 224 preferably changes the spindle rotation speed to a speed S2 (<S1) different from the speed S1, where necessary. In this case, if the in-section motion generation unit 224 sets the spindle speed S2 so as to satisfy S2=S1×(F2/F1), the density of cutter marks can be kept at a constant value to achieve a uniform machining surface, as shown in FIG. 11.

Figure 12:
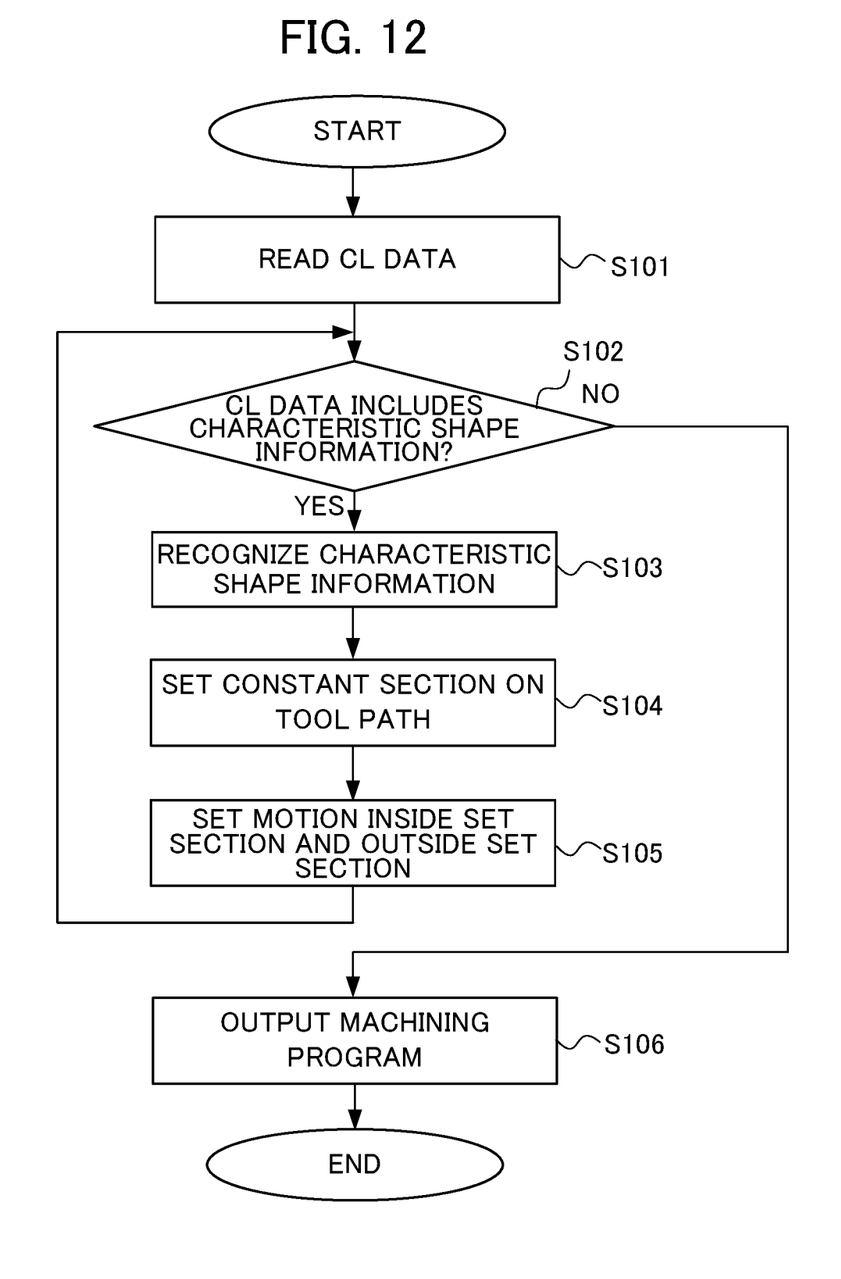
FIG. 12 is a flowchart showing the motion of the postprocessor.

The configuration of the postprocessor 22 is as described above. The motion of the postprocessor 22 will be described next. FIG. 12 is a flowchart showing the motion of the postprocessor 22.

In step S101, the data reading unit 221 reads CL data generated by the main processor 21, for example, and including characteristic shape information. In step S102, the characteristic shape recognition unit 222 determines whether the CL data includes characteristic shape information. For example, the characteristic shape recognition unit 222 determines the presence of characteristic shape information by referring to the process path shown in FIG. 4. If the CL data includes characteristic shape information, the flow goes to step S103. If the CL data does not include new characteristic shape information, the flow goes to step S106. In step S103, the characteristic shape recognition unit 222 recognizes the characteristic shape information in the CL, data. In step S104, the section setting unit 223 sets a constant section on a tool path based on the characteristic shape information recognized by the characteristic shape recognition unit 222 in step S103. In step S105, the in-section motion generation unit 224 generates a part of a machining program (NC data) to be used for controlling motion in a set section. The out-of-section motion generation unit 225 generates a part of the machining program to be used for controlling motion outside the set section. The in-section motion generation unit 224 and the out-of-section motion generation unit 225 generate respective parameters for the machining program. The generated parameters are parameters in one, or two or more of the following parameter sets (1), (2), and (3), for example:

(1) a command speed, an allowable acceleration, an allowable jerk, and a time constant related to acceleration/deceleration control, for a feed axis;
(2) a command speed, an allowable acceleration, an allowable jerk, and a time constant related to acceleration/deceleration control, for a spindle; and
(3) an error amount allowed between a command path and an actual path. In step S105, further, the machining program output unit 226 combines two parts including the part to be used for controlling motion in the set section generated by the in-section motion generation unit 224 and the part to be used for controlling motion outside the set section generated by the out-of-section motion generation unit 225. Then, the flow goes to step S102. If the CL data is determined not to include new characteristic shape information in step S102, the flow goes to step S106. In step S106, the machining program output unit 226 generates and outputs a machining program (NC data).

While the embodiment of the present invention has been described above, the function of the postprocessor 22 can be realized entirely or partially by software. The function of the postprocessor 22 can also be realized by hardware, or by a combination of software and hardware. Being realized by software means being realized by reading and execution of a program by a computer. The postprocessor 22 can be configured by hardware by configuring some or all of the data reading unit 221, the characteristic shape recognition unit 222, the section setting unit 223, the in-section motion generation unit 224, the out-of-section motion generation unit 225, and the machining program output unit 226 of the postprocessor 22 using an integrated circuit (IC) such as a large scale integrated circuit (LSI), an application specific integrated circuit (ASIC), a gate array, or a field programmable gate array (FPGA), for example.

To configure the postprocessor 22 by software, a postprocessor application describing motion such as that shown in FIG. 12 for operating the postprocessor 22 is stored into the first storage unit such as a hard disk drive or a ROM. The CPU stores information necessary for operation into the second storage unit such as a RAM and performs processing by following the postprocessor application, thereby realizing the motion of the postprocessor 22 according to a program. The postprocessor application can be read from a computer-readable information storage medium storing the program into the first storage unit such as a hard disk. The computer-readable information storage medium includes various types of tangible storage media. The computer-readable information storage medium includes a non-transitory computer-readable information storage medium. Examples of the computer-readable information storage medium include a magnetic storage medium (a flexible disk or a hard disk drive, for example), a magneto-optical storage medium (a magneto-optical disk, for example), a CDA read-only memory (CD-ROM), a CD-R, a CD-R/W, and a semiconductor memory (a mask ROM, a programmable ROM (PROM), an erasable PROM (EPROM), a flash ROM, or a random access memory (RAM), for example).

EXPLANATION OF REFERENCE NUMERALS

10 CAD device
20 CAM device
21 Main processor
22 Postprocessor

30 CNC machine tool
310 Numerical controller
20 Servo controller
330 Spindle motor
340 Feed axis motor

What is claimed is:

1. A postprocessor device that outputs a machining program for controlling a CNC machine tool, comprising:
- a characteristic shape recognition unit configured to read information about a characteristic shape to be machined from cutter location data (CL data) including information about a characteristic shape in addition to information about a tool path, wherein the CL data is data generated by a main processor device based on CAD data;
- a section setting unit configured to set one or more set sections on a tool path in response to the information about the characteristic shape; and
- a motion generation unit configured to generate a machining program including instruction for changing at least one parameter to be used for controlling at least one axis of the CNC machine tool outside the set section and inside the set section,
- wherein the information about the characteristic shape includes information about a section in which a tool contacts an edge of a workpiece on a tool path,
- wherein the parameter includes a command speed, an allowable acceleration, an allowable jerk, and a time constant related to acceleration/deceleration control for a spindle outside the set section and inside the set section, the set section being a low-speed section having a start point and an end point set such that the low-speed section is larger than the section in which the tool contacts the edge of a workpiece on the tool path,
- wherein the information about the characteristic shape to be machined are inserted into the CL data as comments in the form of tagged text, and
- wherein the start point of the low-speed section is separated from a start point of the section in which the tool contacts the edge of the workpiece on the tool path by a distance corresponding to the time constant, and the end point of the low-speed section is separated from an end point of the section in which the tool contacts the edge of the workpiece on the tool path by the distance corresponding to the time constant.

2. The postprocessor device according to claim 1, further comprising: a data reading unit configured to read the CL data including the information about the characteristic shape; and a machining program output unit configured to output the machining program.

3. The postprocessor device according to claim 1, wherein the parameter includes a feed speed of a feed axis and a spindle speed, and the motion generation unit generates the machining program including instruction for changing the spindle speed in synchronization with change in the feed speed of the feed axis.

4. The postprocessor device according to claim 1, wherein the CL data includes information about the geometry of a workpiece or a tool path and information about machining content, the informations being described in a format conforming to a data model having a hierarchical structure.

5. A CNC machining system comprising the postprocessor device according to claim 1, and a CNC machine tool for CNC machining on a workpiece based on a machining program generated by the postprocessor device.

6. A machining program generation method implemented by a postprocessor device that outputs a machining program for controlling a CNC machine tool, comprising:
- a step of reading information about a characteristic shape to be machined from cutter location data (CL data) including information about a characteristic shape in addition to information about a tool path, wherein the CL data is data generated by a main processor device based on CAD data;
- a step of setting one or more set sections on a tool path in response to the information about the characteristic shape; and
- a step of generating a machining program including instruction for changing at least one parameter to be used for controlling at least one axis of the CNC machine tool outside the set section and inside the set section,
- wherein the information about the characteristic shape includes information about a section in which a tool contacts an edge of a workpiece on a tool path,
- wherein the parameter includes a command speed, an allowable acceleration, an allowable jerk, and a time constant related to acceleration/deceleration control for a spindle outside the set section and inside the set section, the set section being a low-speed section having a start point and an end point set such that the low-speed section is larger than the section in which the tool contacts the edge of a workpiece on the tool path,
- wherein the information about the characteristic shape to be machined are inserted into the CL data as comments in the form of tagged text, and
- wherein the start point of the low-speed section is separated from a start point of the section in which the tool contacts the edge of the workpiece on the tool path by a distance corresponding to the time constant, and the end point of the low-speed section is separated from an end point of the section in which the tool contacts the edge of the workpiece on the tool path by the distance corresponding to the time constant.

7. A non-transitory computer-readable information storage medium storing a program for machining program generation that causes a computer functioning as a postprocessor device that outputs a machining program for controlling a CNC machine tool to perform:
- a process of reading information about a characteristic shape to be machined from cutter location data (CL data) including information about a characteristic shape in addition to information about a tool path, wherein the CL data is data generated by a main processor device based on CAD data;
- a process of setting one or more set sections on a tool path in response to the information about the characteristic shape; and
- a process of generating a machining program including instruction for changing at least one parameter to be used for controlling at least one axis of the CNC machine tool outside the set section and inside the set section,
- wherein the information about the characteristic shape includes information about a section in which a tool contacts an edge of a workpiece on a tool path,
- wherein the parameter includes a command speed, an allowable acceleration, an allowable jerk, and a time constant related to acceleration/deceleration control for a spindle outside the set section and inside the set section, the set section being a low-speed section having a start point and an end point set such that the low-speed section is larger than the section in which the tool contacts the edge of a workpiece on the tool path, wherein the information about the characteristic shape to be machined are inserted into the CL data as comments in the form of tagged text, and wherein the start point of the low-speed section is separated from a start point of the section in which the tool contacts the edge of the workpiece on the tool path by a distance corresponding to the time constant, and the end point of the low-speed section is separated from an end point of the section in which the tool contacts the edge of the workpiece on the tool path by the distance corresponding to the time constant.

\* \* \* \* \*